United States Patent [19]
Lyall

[11] 3,792,622
[45] Feb. 19, 1974

[54] ROPE AND CHAIN HAULING DEVICES
[75] Inventor: Gordon M. Lyall, Glasgow, Scotland
[73] Assignee: Simpson-Lawrence Limited, Glascow, Scotland
[22] Filed: Feb. 21, 1973
[21] Appl. No.: 335,135

Related U.S. Application Data
[62] Division of Ser. No. 121,400, March 5, 1971.

[52] U.S. Cl. ............................................. 74/243 H
[51] Int. Cl. ............................................. F16h 55/30
[58] Field of Search ................ 74/243 H, 238, 230.5

[56] References Cited
FOREIGN PATENTS OR APPLICATIONS
642,988   7/1935   Germany ........................... 74/243 H

*Primary Examiner*—Leonard H. Gerin
*Attorney, Agent, or Firm*—Hauke, Gifford, Patalidis & Dumont

[57] ABSTRACT

A rope and chain hauling device according to the invention is used for hauling aboard ship the anchor which is normally secured to the ship by a rope and chain. The device, which is in the form of a gipsy or chain wheel, has a hub with side portions so constructed adjacent the boss as to wedgedly grip a rope and having protuberances remote from the hub adapted to engage the links of a chain.

2 Claims, 3 Drawing Figures

INVENTOR
GORDON M. LYALL

BY Hawke, Gifford & Patalidis

ROPE AND CHAIN HAULING DEVICES

This application is a division of application Ser. No. 121,400, filed Mar. 5, 1971.

FIELD OF THE INVENTION

This invention relates to a rope and chain hauling device. More specifically, the invention relates to a device for hauling the rope and chain for a ship's anchor.

Recent developments in ropes have led to the use of rope to connect the chain of an anchor to a vessel. The normal practice is for a short length of chain to be attached to an nchor to increase the weight on the sea bottom and a rope is attached to the free end of the chain to connect the anchor to the vessel.

DESCRIPTION OF THE INVENTION

The device according to the invention is adapted to haul in the rope and the chain of the anchor by so shaping the groove in a conventional gipsy or chain wheel that the rope may be wedged between the sides of the groove, the rope being pulled as the wheel rotates. When the rope has been pulled in to its full extent, the chain engages with the teeth of the gipsy or chain wheel and further rotation of the device pulls in the chain.

It is an object of the invention to provide a hauling device suitable for hauling a rope or a chain, particularly the rope and chain attached to a ship's anchor.

It is also an object of the invention to provide a hauling device which is suitable for hauling various thicknesses of rope and chains of various pitches.

According to the invention, a rope and chain hauling device comprises a wheel member formed by a hub portion and a wall extending radially from each end of said hub portion to form a peripheral channel therebetween, said channel having a lower converging portion extending to said hub portion and an upper portion extending from the lower portion to the periphery of said walls, said lower converging portion having inwardly projecting opposed portions peripherally spaced around each wall portion, said upper portion having spaced opposed teeth members formed on each wall portion adapted to engage the links of a chain.

DESCRIPTION OF THE DRAWINGS

A preferred embodiment of the invention is illustrated in the accompanying drawings in which.

DETAILED DESCRIPTION OF THE PREFERRED EMBODIMENT

Figure 2:
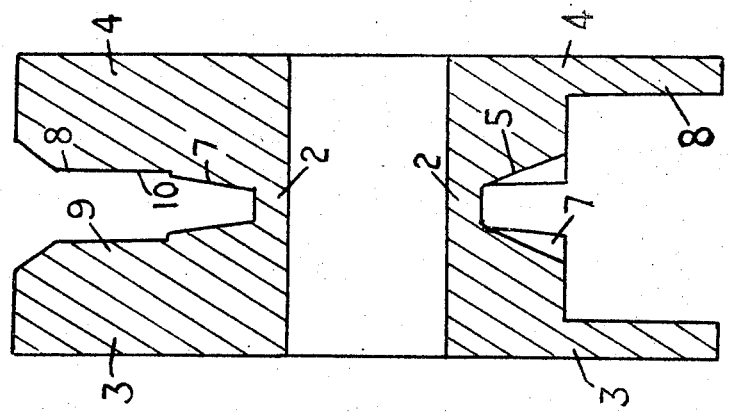
FIG. 2 is a sectional view of the device on the line A—A of FIG. 1.

Referring to the drawings, 1 denotes generally a gipsy wheel or winch having a hub portion 2 and two walls 3 and 4 extending radially therefrom to form a peripheral channel therebetween.

The walls 3 and 4 at their lower portion 5 adjacent the hub converge towards the hub portion 2. The inner portion 5 of the wall 3 is formed with peripherally spaced portions 7 protruding inwardly towards the wall 4, and the wall 4 is provided with similarly spaced protruding portions 7 in opposed relation.

The outer portion 8 of each wall is formed with opposed spaced teeth members 9. The teeth members 9 on each wall are formed by axially projecting abutments.

The abutments each have a flat projecting surface 10 substantially in the form of an isosceles triangle, the base 11 of which is formed adjacent the lower portion 5 of wall, and the sides 12 and 13 which diverge towards its associated wall and the vertex is located inwardly of the outer periphery of the wall and diverges towards the periphery of the wall.

The lower portion 5 of the channel is adapted to wedgedly receive a rope 15 and the teeth on the upper portion 8 are adapted to engage the links of a chain 16.

Figure 1:
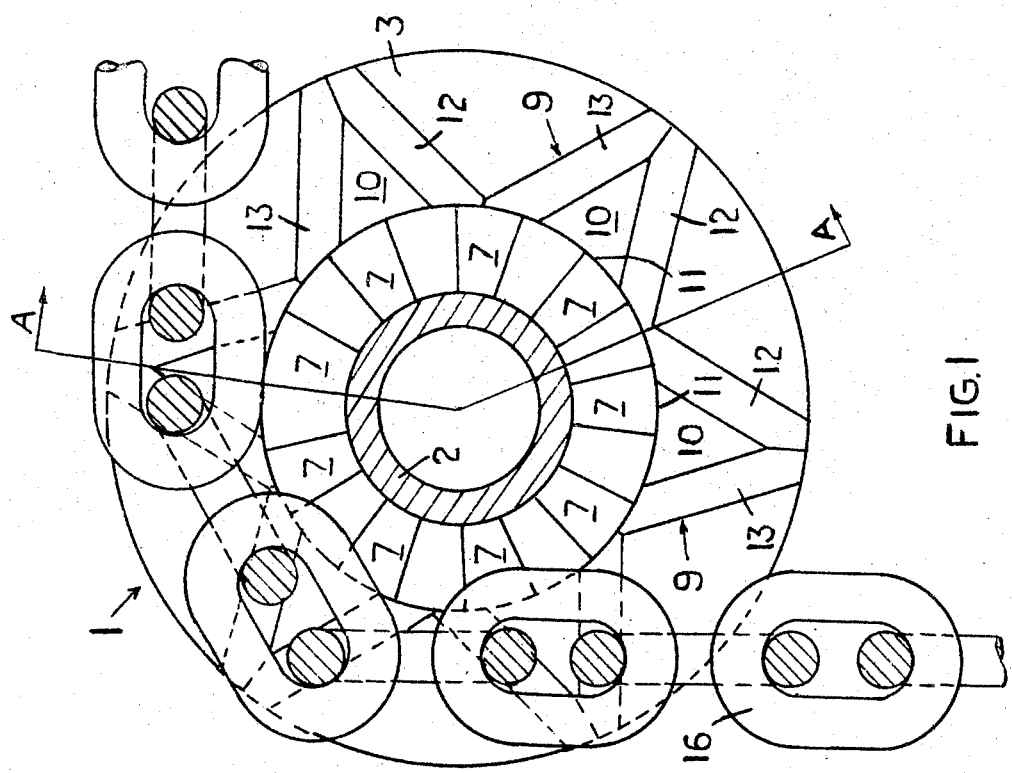
FIG. 1 is a sectional side view of the device according to the invention showing a section of chain engaged therein.
Figure 3:
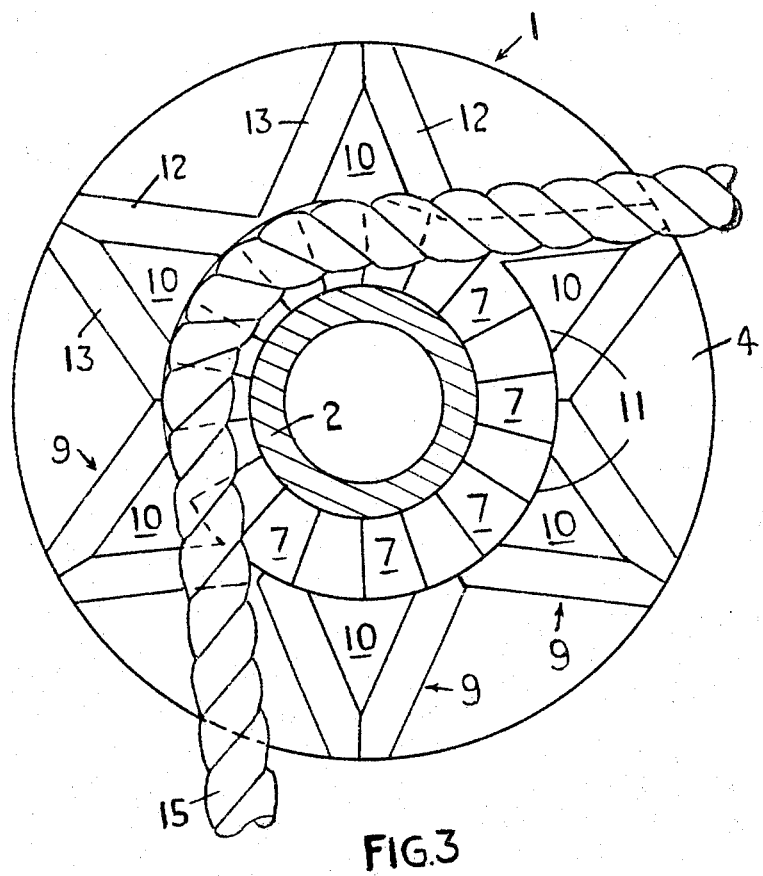
FIG. 3 is a view identical to FIG. 1 but showing a portion of rope engaged therein.

In operation, a rope 15 attached to an anchor chain 16 is engaged in the lower portion 5 of the channel and wedged by the opposed converging protruding portions 7. As the device is rotated, the rope 15 is hauled in until the chain 16 engages the teeth members 9 on the upper portion of the channel as illustrated in FIG. 1 and further rotation of the device hauls in the chain with the anchor attached thereto.

The opposed protruding portions 7 on the lower wall portion 5 may be offset in relation to each other so that a protruding portion 7 on one wall is located opposite the space between adjacent protruding portions 7 on the opposite wall.

What is claimed is:

1. A combined rope and chain hauling device comprising a wheel member formed by a hub portion and a wall extending radially from each end of said hub portion to form a peripheral channel therebetween, said channel forming an inner rope accommodating portion and an outer chain accommodating portion, said rope accommodating portion comprising straight walls diverging radially from said hub portion to said chain accommodating portion such that extension of said walls toward said hub would produce intersection of said walls, peripherally spaced, opposed substantially trapezoidal shaped rope gripping surfaces being provided on each of said walls and projecting axially towards each other, the distance between opposed rope gripping surfaces increasing radially outwardly to accommodate ropes of various thickness, said chain accommodating portion extending radially outwardly from the rope accommodating portion to the periphery of said walls and having peripherally spaced opposed teeth members formed on each wall, said teeth members each comprising a projection having a flat surface substantially in the form of an isosceles triangle having its vertex located adjacent the outer periphery of said wall and the sides of said triangle providing various pitch length link engaging means.

2. A combined rope and chain hauling device as claimed in claim 2 in which the shortest side of the trapezoidal rope gripping surface is adjacent the hub, the base of the isosceles triangle is formed adjacent the rope accommodating portion, and the sides of said triangle diverge towards the wall surface.

* * * * *

UNITED STATES PATENT OFFICE
CERTIFICATE OF CORRECTION

Patent No. 3,792,622　　　　　　　　　Dated February 19, 1974

Inventor(s)　　　Gordon M. Lyall

It is certified that error appears in the above-identified patent and that said Letters Patent are hereby corrected as shown below:

Column 2, line 58, delete the numeral "2" and insert --1--.

Signed and sealed this 4th day of June 1974.

(SEAL)
Attest:

EDWARD M. FLETCHER, JR.　　　　　　　　C. MARSHALL DANN
Attesting Officer　　　　　　　　　　　Commissioner of Patents